July 27, 1954 — R. CHRIMACKER — 2,684,857
CHUCK

Filed April 7, 1949 — 4 Sheets-Sheet 2

Inventor
RENE CHRIMACKER
By
Louis H. Cameau,
Attorney

July 27, 1954     R. CHRIMACKER     2,684,857
CHUCK

Filed April 7, 1949                               4 Sheets-Sheet 3

Inventor
RENE CHRIMACKER
By
Attorney

July 27, 1954  R. CHRIMACKER  2,684,857
CHUCK

Filed April 7, 1949  4 Sheets-Sheet 4

Inventor
RENE CHRIMACKER
By
Attorney

Patented July 27, 1954

2,684,857

UNITED STATES PATENT OFFICE 2,684,857

CHUCK

René Chrimacker, Toronto, Ontario, Canada

Application April 7, 1949, Serial No. 85,990

12 Claims. (Cl. 279—121)

This invention relates to a chuck.

More particularly, the invention relates to a chuck for apparatus used in diamond drilling.

As is well known, in deep drilling, for instance, the drilling bit is secured to one end of a rod—usually a tubular rod—and the rod is attached to a chuck. In some drilling apparatus, the chuck is attached to the lower end of a feed screw; in other apparatus, the chuck is attached to the lower end of a spline feed shaft. In either installation, the screw, or the spline feed shaft as the case may be, is rotated and fed downwardly, the chuck and the section of the rod secured thereto rotating and being fed toward the work. The feed screw, or the spline feed shaft as the case may be, has a feed of predetermined maximum length, usually 18", and it is effective only on its downward stroke. When the feed screw, or spline feed shaft as the case may be, has completed its feeding or downward stroke, it is raised to its initial or starting position.

The chuck has to be released from the drill rod after each downward or feeding stroke of the feed screw or feed shaft, and has to be secured to the drill rod again after the screw or feed shaft has been raised to its initial position and before it is made to resume its feeding stroke. So releasing the chuck from the drill rod and again securing the same to the drill rod requires labour, and the operation of securing the chuck to the drill rod calls for particular care and skill if the rod is to be properly centered.

The objects of the invention, generally, are to improve on known chucks used in drilling apparatus, especially apparatus used in deep drilling.

A specific object of the invention is to provide a chuck which will easily and quickly release the drill rod at the end of the feeding stroke and will easily and quickly receive the drill rod in locked, operative engagement, and in accurately centered position, before it resumes its feeding stroke, all automatically, the chuck thus being fully self-operating.

Another specific object is to provide a chuck which is provided with a torque overload protection means.

Another specific object is to provide a chuck which includes a yielding element effectively between the drill rod and the feed screw or feed shaft permitting of a limited relative longitudinal displacement between the rod and the feed screw.

Another specific object is to provide a chuck which includes a plurality of jaws for clamping the drill rod to the chuck.

Another specific object is to provide a chuck which will prevent damage to or collapse of the hollow drill rod, when such hollow rod is used.

Another specific object is to provide a chuck which includes a member mounted for relative longitudinal movement only in the body, and jaws carried by the member for effectively clamping the drill rod to the chuck, the rod-clamping force of the jaws varying as the function of the relative position of the member and the body of the chuck.

Another specific object is to provide a chuck which includes a member mounted for relative longitudinal movement only in the body, and jaws carried by the member for clamping the drill rod, the jaws at one end effectively sliding on slanted lubricated faces of a cam member movable with the body.

Another specific object is to provide a chuck having a member mounted for relative longitudinal movement only in the body and jaws carried by the member for clamping the drill rod, the clamping pressure of the jaws being a function of the relative position of the member and the body, and including also means for urging the member to move in the body so as to cause the jaws to clamp the drill rod.

In the drawings, wherein like numerals of reference indicate corresponding parts in the various figures, Figure 1 is a longitudinal section of a chuck made according to the invention, the chuck being here shown when in fully unloaded position;

Figure 1:
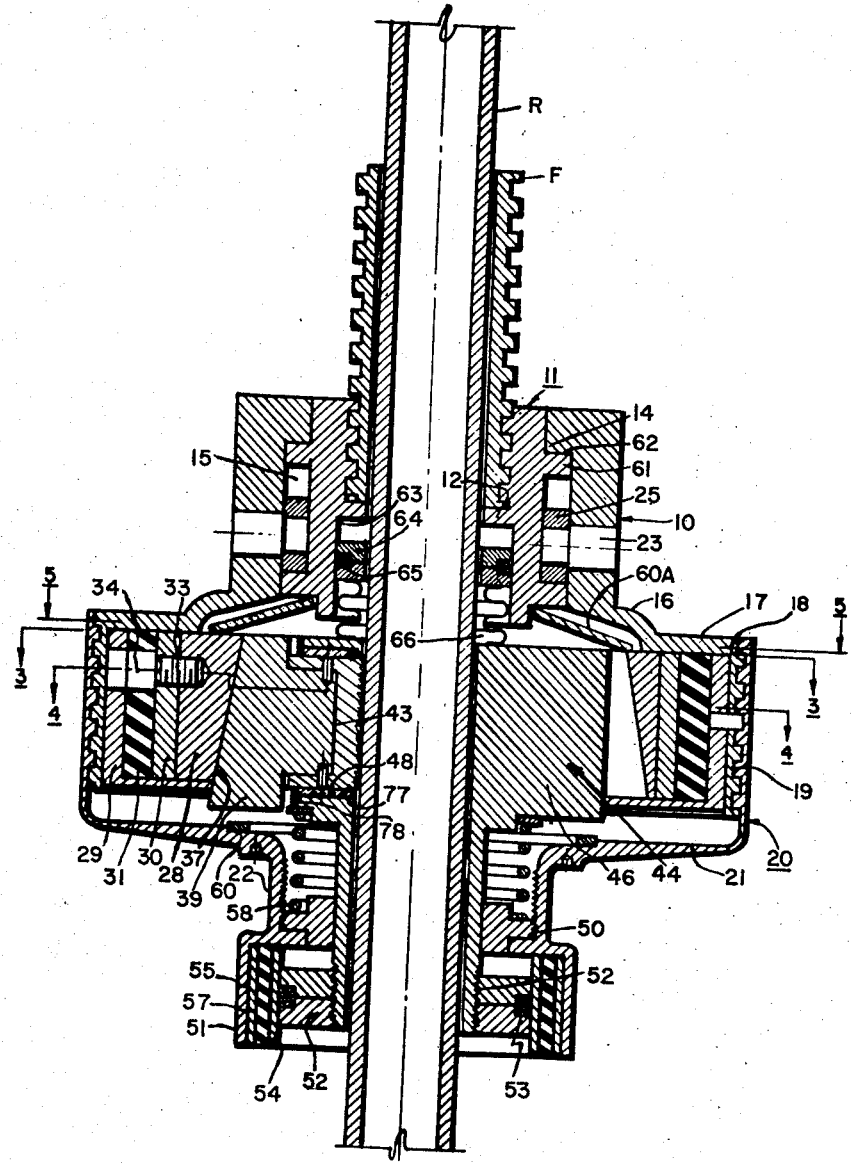
Figure 2:
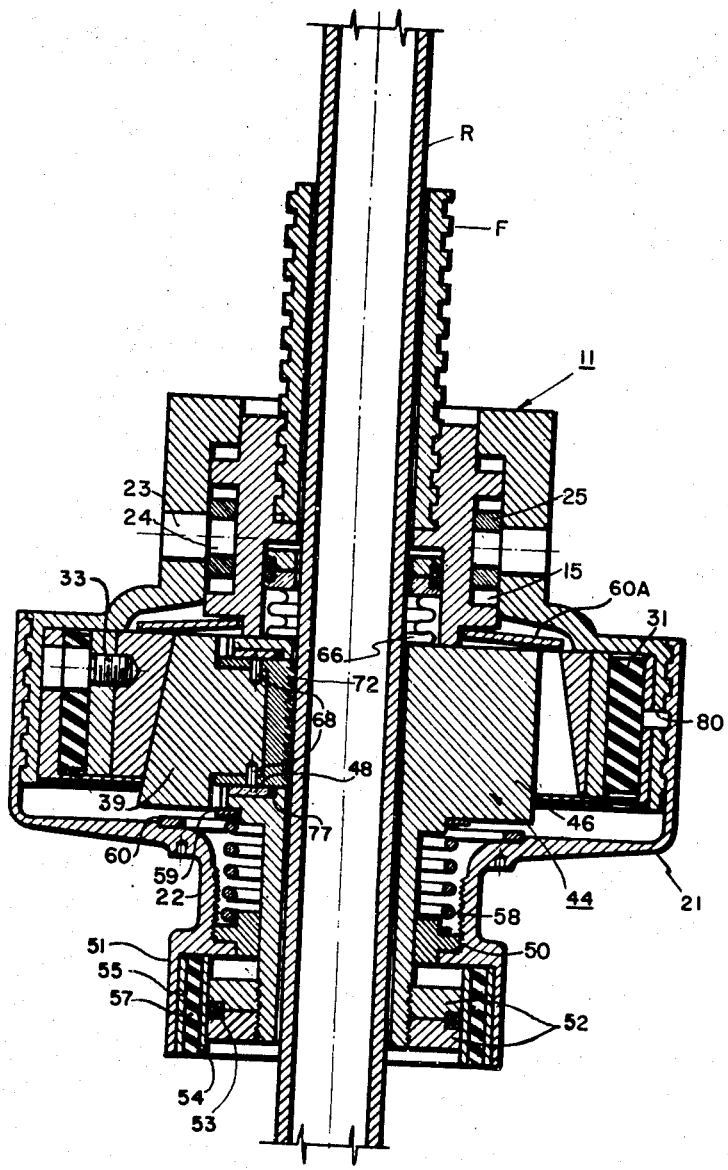
Figure 2 is a view similar to Figure 1, but showing the chuck fully loaded.
Figure 3:
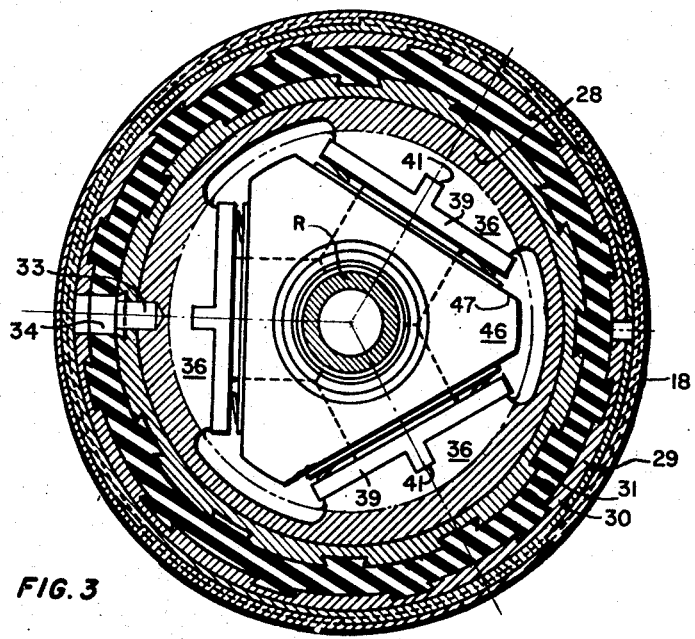
Figure 3 is a section on about line 3—3 in Figure 1.
Figure 5:
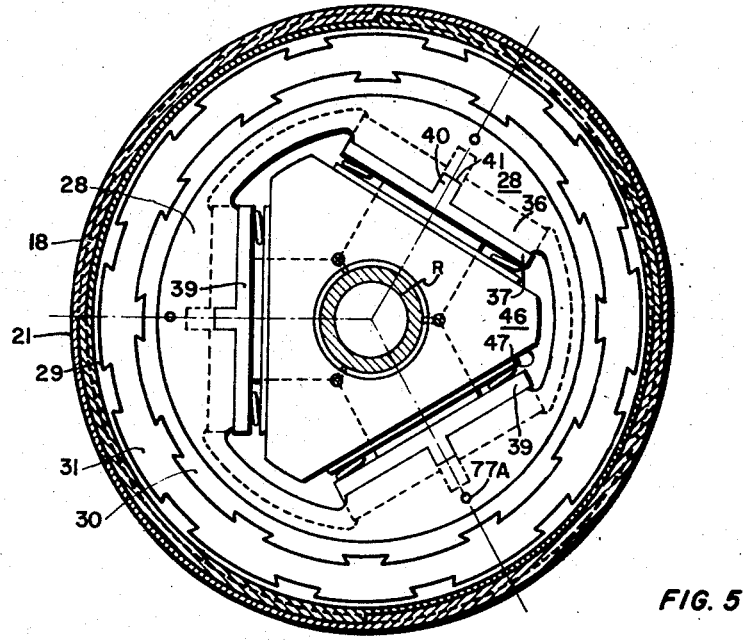
Figure 4:
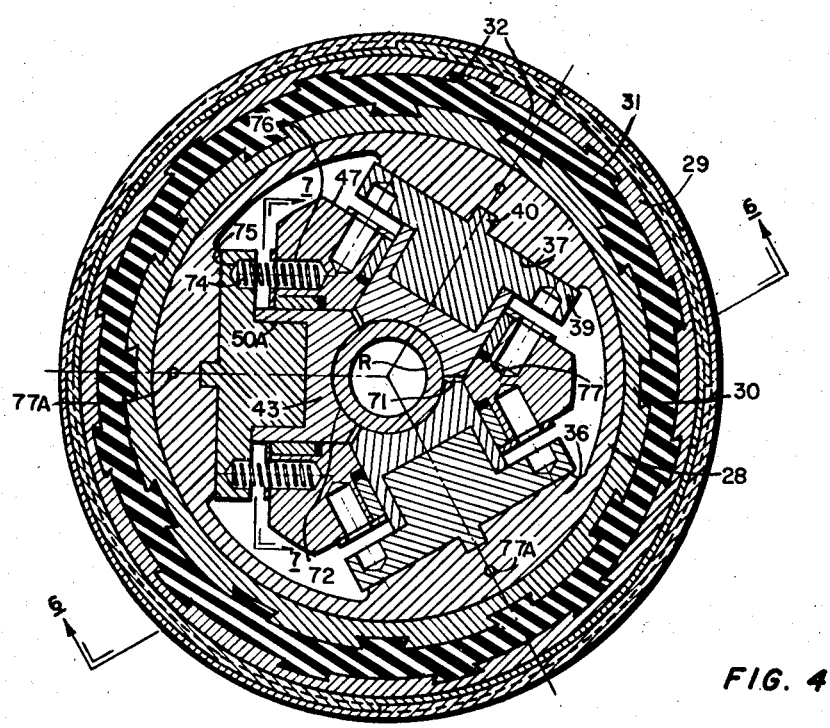
Figure 4 is a section on line 4—4 in Figure 1.
Figures 6, 7:
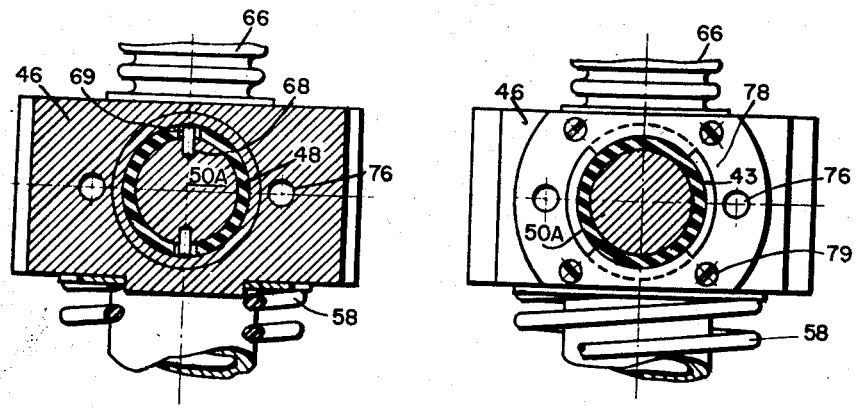

Figures 5, 6 and 7 are sections on about lines 5—5, 6—6 and 7—7, respectively, in Figures 1, 4 and 4.

Referring now to the drawings, F shows, in part only, a typical feed screw of drilling apparatus (not shown) used for diamond drilling. As is known, the feed screw is lowered on its feeding stroke, and is raised back to initial position after it has reached the end of its feeding or effective stroke.

R shows, in part only, a section or length of a tubular drilling rod, on the lower end of which is secured the drilling tool (not shown), say, a diamond drill.

The chuck comprises a hollow body 10 which is adapted to be operatively secured to the lower end of the feed screw F. The body includes or encloses a tubular member or adaptor 11 bored and threaded to thread onto the lower end of the feed screw. The threaded portion of the bore terminates in a shoulder 12 adapted to be engaged by the lower end of the screw thereby to determine the operative position of the adaptor on the feed screw.

The outer circular face 14 of the adaptor 11 is recessed, preferably on diametrically opposite sides, as at 15, the recess assuming the shape or form of an elongated slot having its longer axis lengthwise of the longitudinal axis of the feed screw. If preferred, the slot may be disposed with its axis at an angle to the horizontal.

The body 10 also includes a tubular body or member 16, the member comprising a lateral wall 17 and a skirt 18 threaded on its outside face as at 19. Threaded to the body member 16, more particularly to the skirt 18, is a bottom member 20 which includes a horizontal wall 21 and a depending vertical wall 22 having its interior face threaded as at 59. The lower end of the cover, below the wall 22, is formed with an enlarged portion defined in part by a vertical wall 51.

Secured within the body below, and in engagement with the wall 17 is an assembly including an insert 28 forming cam means, the purpose of which will be explained later. Included in the assembly of which 28 forms a part, are two spaced metallic outer and inner rings 29 and 30, respectively, and an intermediate ring or member 31 of a resilient material, such as rubber. The rubber is preferably adhered or bonded to the metallic rings. The adjacent faces of the rings 29 and 30 are formed with vertically directed recesses 32 in which material of the member 31 is embedded. Preferably, the insert 28 is secured to the inner ring 30 as by screws 33, to which access is gained through holes 34 made through the rings 29, 31 and 30. The assembly is held in position by pins 89 through the outer ring 29 and the skirt 18 of the body 10. The insert thus is operatively connected to the skirt 18 of the body 10 through a resilient coupling, so that the insert is capable of a limited rotary movement with respect to the body, as well as a limited transverse movement, all because of the resiliency of the intermediate ring 31. In other words, there is provided a cushion between the insert and the body 10.

The insert 28 is formed with a plurality of portions 36 of increased depth—say three as shown—formed with flat faces 37 slanted inwardly from bottom to top. Slidably engaging each of the flat faces 37 of the insert 28 is a member or shoe 39, the sliding movement of the shoe on the face 37 being constrained to a vertical plane by a tongue 40 formed on the shoe sliding in a groove 41 formed into the insert. The shoe includes a portion 58A of circular cross-section. Associated with each of the shoes 39 is a jaw 43, the jaw being adapted to clasp therebetween the drill rod R. As will be more particularly explained later, the jaws 43 are mounted in a tubular jaw-carrying member 44 adapted to receive therewithin the drill rod R, and is mounted for bodily movement longitudinally of the body 10.

The jaw-carrying member 44 is formed intermediate of its length with an enlarged portion or hub 46 substantially triangular in plan, adapted to support the jaws, more particularly supporting annular bearings 48, and presenting three flat vertical faces 47. The lower end of the member 44 carries a flange such as two nuts 52 threaded thereto formed with annular registering shoulders defining a groove in which is a suitable gasket 53. The flange engages the inner face of an inner metallic ring 54 which forms part of an assembly disposed between the flange and the inner face of the wall 51 of the bottom cover, the assembly including an outer metallic ring 55 connected to the inner ring 54 as by a ring 57 of resilient material, such as rubber. The lower end of the jaw-carrying member, and more particularly, the flange 52—52, is thus capable of a limited bodily transverse movement toward and away from the wall 51 of the bottom cover.

Threaded through the wall of the body member are pins 23, the pins having reduced ends 24 receiving members, in the shape of rollers 25, which are received in the recesses 15, respectively. The diameter of the roller is such that the roller engages the walls of the recess in a loose fit. The body is thus operatively connected to the adaptor 11 by the pins 23 and rollers 25, the pins serving as shear pins determining the maximum torque to be applied to the member 16 by the feed screw.

Adjustably threaded within the bottom cover, to its wall 22, is an annular ring 50 which forms a support for the lower end of a coil spring 58, by the upper end of which the jaw-carrying member 44 is supported within the body. Preferably as shown, the upper end of the spring bears against a washer 59 seated against the member 44. Preferably also, an annular ring or shim 60 is seated in a recess formed into the bottom wall 21 of the cover, below the shoes 39. The spring 58 thus urges the member 44 upwardly. The upward force exerted by the spring 58 tending to raise the member 44 is varied by changing the threaded position of the ring 50. The tension imparted to the spring 58 by the adjustment of the ring or nut 50 is so chosen as to absorb the weight of the member 44 and parts supported thereby, and to cause the jaws to clasp the drill rod with sufficient pressure to hold to the rod and hold the member 44 against downward movement along the rod when the body is thrust downwardly by the feed screw.

Effectively interposed between the body, more particularly the insert 28, and the adaptor 11, is a resilient element in the form of a spring ring 60A. Thus, the downward thrust imposed by the feed screw is transmitted to the body through the spring 60A. The arrangement is such that, normally, that is, when the feed screw is not moving on its feeding stroke and no thrust is imposed upon the body, the rollers 25 will lie in the bottom of the slots 15, as best seen in Figure 1, the normal relative position of the adaptor 11 and of the body being determined by the engagement of a shoulder 61 of the adaptor with a shoulder 62 of the body 10.

On the other hand, when the adaptor has moved down a pre-determined distance into the body against the tension in the spring 60A, the lower end of the adaptor engages the hub 46 of the jaw-carrying member 44, determining the downward position of the adaptor in the body. Slidably engaging the face 63 of the lower enlarged bore of the adaptor, below the annular shoulder 12, is a ring 64 carrying a suitable gasket 65. Welded between the ring 64 and the upper face of the hub 46 of the jaw-carrying member 44 is a metallic bellows element 66.

The jaw 43 is of circular cross-section so that it may be rotatable within the bushing 48, the jaw in turn being rotatable on the journal 50A of the shoe 39. In order to limit the rotation of the shoe in the bushing 48—in practice, it is limited to an arc of 10°—diametrically opposed pins 68 are anchored in the journal 50A and project into slots 69 formed in the wall of the shoe.

The jaws are of such size and have such transverse width that their combined effective rod-engaging faces will equal substantially 360° in circumference, so that substantially the entire circumference of the rod will be clasped by the jaws, all as best shown in Figure 4, a small gap, shown as 71, being provided between adjacent jaws to enable a slight rotary movement of the jaws on their respective shoes 39 as allowed by the arcual effective length of each of the slots 69. The rod-engaging face 72 of the jaw is serrated as by threading. If the feed screw has a right-hand thread, the serrations will consist of left-hand threads.

The shoes 39 are urged away from the hub 46 of the jaw-carrying member 44, tending to cause the jaws to release the drill rod, as by coil springs 74 tensioned between the hub and the shoe. Thus, as best seen in Figure 4, the springs are seated in registering circular recesses 75 and 76 formed into the adjacent faces of the shoe and of the hub, respectively. A suitable gasket 77 is disposed between the inner edge of the bushing 48 and the hub 46 as by a plate 78 secured to the hub as by screws 79 (see Figure 7).

In order to lubricate the co-engaging or relatively movable parts of the chuck, especially the co-engaging faces of the insert 28 and the shoes 39, the hollow body is at least partially filled with a suitable oil. Accordingly, oil ducts 77A conveniently may be provided through the insert.

Operation

The chuck is applied to the lower end of the feed member, as by threading. The bottom cover 20 is rotated a fraction of a turn so as to be lowered on the chuck body, thus releasing the tension in the spring 58 and causing the jaw-carrying member 44 to lower, and causing also the jaws to move outwardly under the action of the springs 74.

The drill rod can now be inserted through the feed member and through the chuck. Once the rod is in position, the bottom cover is rotated or moved up on the body. So moving the bottom cover will tension the spring 58, raise the jaw-carrying member 44 and cause the jaws effectively to engage or clamp the drill rod. The power plant is next operated to turn the feed member and longitudinally displace the same on its feeding or downward stroke. As the jaw-carrying member turns with the body, the jaws are turned therewith. The thrust imposed by the feed member is transmitted to the body member through the spring 60A and the force with which the jaws clamp the drill rod is a function of the position of the jaw-carrying member relatively to the body member. The spring 60A will also act as a yielding cushion between the thrust-imposing member or adaptor 11 and the body member, so that the drill bit will be better protected against shock.

As already stated, the force with which the jaws clamp the drill rod varies as a function of the relative position of the jaw-carrying member and the body, such force increasing gradually as the jaw-carrying member rises in the body, until the jaw-carrying member, more particularly its hub, engages the lower end of the adaptor 11. When the jaw-carrying member so engages the adaptor, the thrust of the feed screw is applied directly to the jaw-carrying member. This will determined or limit the maximum pressure with which the drill rod will be clamped by the jaws.

As will be clearly seen, the shoes slide on lubricated surfaces, while the jaws grip the drill rod by means of a serrated, unlubricated surface; and since the plane of the cam face 37 of the insert 28 lies at a relatively small angle to the vertical, a relatively small downward force imposed upon the body will result in a greatly increased lateral force acting upon the jaws to move them toward the drill rod, resulting in considerable friction between the drill rod and the jaws.

What I claim is:

1. In drilling apparatus including a tubular feed member and a drill rod; a chuck for operatively securing said drill rod to said feed member comprising, a hollow body adapted to be secured to said feed member to turn therewith, a tubular member turning with said body and mounted therein for longitudinal movement, said tubular member surrounding said drill rod, jaws mounted in said tubular member for movement toward and away from said drill rod and operatively moved by a relative movement of said tubular member and said body, and resilient means for urging a relative movement of said tubular member and said body tending to move said jaws toward said drill rod to clamp the same.

2. In drilling apparatus including a tubular feed member and a drill rod; a chuck for operatively securing said drill rod to said feed member comprising, a hollow body adapted to be secured to said feed member to turn therewith, said body including a bottom cover adjustably secured thereto, a tubular member mounted in said body to turn therewith but free to move longitudinally thereof, said tubular member surrounding said drill rod, jaws slidably mounted in said tubular member to move toward said drill rod to engage the same and to move away from said drill rod to disengage the same, co-operating means on said body and on said jaws for moving said jaws toward and away from said drill rod by a relative movement of said tubular member and said body, and a spring tensioned between said cover and said tubular member for urging a relative movement of said tubular member and said body tending to move said jaws toward said drill rod.

3. In drilling apparatus including a tubular feed member and a drill rod; a chuck for operatively securing said drill rod to said feed member comprising, a circular member adapted to be secured to said feed member to turn therewith, a hollow body having a bore movably receiving said circular member, a shear pin between said circular member and said hollow body for turning said hollow body by said feed member, a tubular member turning with said hollow body and mounted therein for relative longitudinal movement, said tubular member surrounding said drill rod, jaws mounted in said tubular member for movement toward and away from said drill rod and operatively moved by a relative movement of said tubular member and said hollow body, and means for urging a relative movement of said tubular member and said hollow body to move said jaws toward said drill rod to clamp the same.

4. In drilling apparatus including a tubular feed member and a drill rod; a chuck for operatively securing said drill rod to said feed member comprising, a circular member adapted to be secured to said feed member to turn therewith, a hollow body having a bore receiving said circular member, said hollow body including a bottom wall adjustably secured thereto, a shear pin between said hollow body and said circular member for turning said hollow body by said feed member, a tubular member turning with said hollow body and mounted therein for relative longitudinal movement, said tubular member surrounding said drill rod, jaws slidably mounted in said tubular member for movement toward said drill rod to engage the same and away from said drill rod to disengage the same, cooperating means in said hollow member and on said jaws for moving said jaws toward and away from said drill rod by a relative movement of said hollow body and said tubular member, and resilient means between said bottom wall and said tubular member for urging a relative movement of said tubular member and said hollow body tending to move said jaws toward said drill rod.

5. In drilling apparatus including a tubular feed member and a drill rod; a chuck for operatively securing said drill rod to said feed member comprising, a circular member adapted to be secured to said feed member to turn therewith, a hollow body having a bore receiving said circular member, means between said circular member and said hollow body for turning said hollow body by said feed member but permitting of a limited relative longitudinal movement of said hollow body on said circular member, a spring between said circular member and said hollow body, a tubular member turning with said hollow body and mounted therein for longitudinal movement, said tubular member surrounding said drill rod, jaws movably mounted in said tubular member operable to move toward and away from said drill rod by a relative movement of said tubular member and said hollow body to engage and disengage said drill rod, said tubular member and said circular member having portions adapted to engage one another when said spring has been compressed to a predetermined extent, and resilient means for urging a relative movement of said tubular member and said hollow body tending to move said jaws toward said drill rod.

6. In drilling apparatus including a tubular feed member and a drill rod; a chuck for operatively securing said drill rod to said feed member comprising, a circular member adapted to be secured to said feed member to turn therewith, a hollow body having a bore receiving said circular member, said hollow body including an adjustable bottom cover, means between said circular member and said hollow member for turning said hollow body by said feed member but permitting of a limited relative longitudinal movement of said hollow body on said circular member, a spring between said circular member and said hollow body, a bottom cover adjustably secured to said hollow member, a tubular member turning with said hollow body and mounted therein for longitudinal movement, said tubular member surrounding the drill rod, jaws movably mounted in said tubular member operable to move toward and away from said drill rod by a relative movement of said tubular member and said hollow body to engage and disengage said drill rod, said tubular member and said circular member having portions adapted to engage one another when said spring has been compressed to a pre-determined extent, and a spring tensioned between said bottom cover and said tubular member tending to move said tubular member in said hollow body to move said jaws into engagement with said drill rod.

7. In drilling apparatus including a tubular feed member and a drill rod; a chuck for operatively securing said drill rod to said feed member comprising, a hollow body adapted to be secured to said feed member to turn therewith, a tubular member turning with said hollow body and mounted therein for relative longitudinal movement, said tubular member surrounding said drill rod, said tubular member and said hollow body being formed to provide a chamber therebetween, jaws mounted in said tubular member for bodily movement transversely of the longitudinal axis of said tubular member to engage and disengage said drill rod, said jaws each including a shank sliding through the wall of said tubular member and having a shoe in said chamber co-operating with said hollow body bodily to move said jaws transversely as a function of the relative movement of said tubular member and said hollow body, resilient means for urging a relative movement of said hollow body and said tubular member tending to move said jaws toward said drill rod, and a lubricating fluid in said chamber.

8. In drilling apparatus including a tubular feed member and a drill rod; a chuck for operatively connecting said drill rod to said feed member comprising, a hollow body adapted to be operatively secured to said feed member to turn therewith, a tubular member mounted in said body for longitudinal movement therein, said tubular member surrounding said drill rod, jaws mounted in said tubular member for movement toward and away from said drill rod, cam means turning with said hollow body for turning said tubular member therewith and for moving said jaws as a function of the relative longitudinal displacement of said hollow body and said tubular member, and a resilient coupling between said hollow body and said cam means.

9. In drilling apparatus including a feed member and a drill rod; a chuck for operatively connecting said drill rod to said feed member comprising, a hollow body adapted to be operatively connected to said feed member to turn therewith, said hollow body including a lower removable member defined in part by a vertical wall, a tubular member mounted in said hollow body for longitudinal movement therein, said tubular member surrounding said drill rod, jaws mounted in said tubular member for movement toward and away from said drill rod, cam means turning with said hollow body for turning said tubular member therewith and for moving said jaws as a function of the relative longitudinal displacement of said hollow body and said tubular member, and a resilient member between the lower end of said tubular member and said wall permitting a limited bodily transverse movement of said lower end within said hollow body.

10. In drilling apparatus including a feed member and a drill rod; a chuck for operatively connecting said drill rod to said feed member comprising, a hollow body adapted to be operatively connected to said feed member to turn therewith, said hollow body including a lower removable member defined in part by a vertical wall, a tubular member mounted in said body for longitudinal movement therein, said tubular member surrounding said drill rod, jaws mounted in said tubular member for movement toward and away from said drill rod, cam means turning with said body for turning said tubular member therewith and for moving said jaws as a function of the relative displacement of said body and said jaws, a spring for urging a relative displacement of said body and of said jaws tending to move said jaws toward said drill rod, and a resilient member between the lower end of said tubular member and said wall permitting a limited bodily transverse movement of said lower end within said hollow body.

11. In drilling apparatus including a feed member and a drill rod; a chuck for operatively connecting said drill rod to said feed member comprising, a hollow body adapted to be operatively connected to said feed member to turn therewith, a tubular member turning with said hollow body, and mounted therein for relative longitudinal movement, said tubular member surrounding said drill rod, jaws mounted in said tubular member for bodily movement transversely of the longitudinal axis of said tubular member to engage and disengage said drill rod, said jaws each including a shank sliding through the wall of said tubular member and having a cam, cams secured in said hollow body co-operating with said first-named cams to move said jaws as a function of the relative movement of said hollow body and said tubular member, said cams defining with said tubular member and said hollow body a chamber, a lubricating fluid in said chamber, and resilient means urging a relative movement of said hollow body and said tubular member tending to move said jaws toward said drill rod.

12. In drilling apparatus including a feed member and a drill rod; a chuck for operatively connecting said drill rod to said feed member, comprising a hollow body adapted to be operatively connected to said feed member to be turned thereby and through which said drill rod projects, a tubular member mounted in said body for longitudinal movement therein, and surrounding said drill rod, said body and tubular member forming a closed chamber, jaws adapted to engage said drill rod and each including a shank slidable through the wall of said tubular member to extend into said chamber, co-operating cam means on said shanks and on said body for displacing said jaws toward and away from said drill rod as a function of a relative longitudinal displacement of said body and said tubular member, resilient means urging a relative displacement of said body and said tubular member tending to urge said jaws toward said drill rod, and a lubricating fluid in said chamber for lubricating said cam means.

References Cited in the file of this patent

UNITED STATES PATENTS

| Number | Name | Date |
|---|---|---|
| 318,678 | Adams | May 26, 1885 |
| 1,120,530 | Pieper | Dec. 8, 1914 |
| 1,503,809 | Schulz et al. | Aug. 5, 1924 |
| 1,816,655 | Ragen | July 28, 1931 |
| 2,191,371 | Church | Feb. 20, 1940 |
| 2,534,213 | Alexander | Dec. 19, 1950 |

FOREIGN PATENTS

| Number | Country | Date |
|---|---|---|
| 127,138 | Great Britain | May 29, 1919 |
| 164,350 | Great Britain | Dec. 7, 1922 |
| 265,049 | Great Britain | Feb. 3, 1927 |